US012672617B2

(12) United States Patent (10) Patent No.: US 12,672,617 B2
Redington et al. (45) Date of Patent: Jul. 7, 2026

(54) METHODS AND SYSTEMS FOR VERTICAL HYDROPONIC PLANT CULTIVATION

(71) Applicant: RediFarms LLC, Westfield, NJ (US)

(72) Inventors: Gregory J. Redington, Westfield, NJ (US); Michele Modestino, Westfield, NJ (US)

(73) Assignee: RediFarms LLC

( * ) Notice: Subject to any disclaimer, the term of this patent is extended or adjusted under 35 U.S.C. 154(b) by 57 days.

(21) Appl. No.: 18/756,026

(22) Filed: Jun. 27, 2024

(65) Prior Publication Data

US 2025/0000040 A1 Jan. 2, 2025

Related U.S. Application Data

(60) Provisional application No. 63/523,369, filed on Jun. 27, 2023.

(51) Int. Cl.
*A01G 31/02* (2006.01)
*A01G 9/24* (2006.01)

(52) U.S. Cl.
CPC ........... *A01G 31/025* (2025.01); *A01G 9/249* (2019.05); *A01G 31/023* (2025.01)

(58) Field of Classification Search
CPC ...... A01G 31/025; A01G 31/06; A01G 9/025; A01G 9/022; A01G 9/023; A01G 9/249
See application file for complete search history.

(56) References Cited

U.S. PATENT DOCUMENTS

| | | | |
|---|---|---|---|
| 7,143,544 B2 * | 12/2006 | Roy | A01G 31/02 |
| | | | 47/60 |
| 7,877,927 B2 | 2/2011 | Roy et al. | |
| 8,966,819 B1 | 3/2015 | Cosmann | |
| 9,591,814 B2 | 3/2017 | Collins et al. | |
| 10,499,575 B2 * | 12/2019 | Stoltzfus | A01G 9/022 |
| 10,602,671 B2 | 3/2020 | Limpert et al. | |
| 10,694,681 B2 * | 6/2020 | Topps | A01C 1/00 |
| 10,856,480 B2 | 12/2020 | Moffitt et al. | |
| 10,863,679 B2 * | 12/2020 | Tyink | A01G 9/249 |
| 10,980,188 B2 * | 4/2021 | Duncan | A01G 9/025 |
| 11,229,165 B2 | 1/2022 | Iamundi | |
| 11,298,655 B2 | 4/2022 | Cavote et al. | |
| 11,464,180 B2 | 10/2022 | Martin et al. | |
| 11,647,708 B2 | 5/2023 | Langille et al. | |
| 11,672,215 B2 | 6/2023 | Hersh | |
| 11,758,859 B2 | 9/2023 | Howe | |
| 12,268,136 B2 * | 4/2025 | Law | A01G 9/025 |
| 2014/0144079 A1 | 5/2014 | Lin | |

(Continued)

FOREIGN PATENT DOCUMENTS

| | | | | |
|---|---|---|---|---|
| CN | 203321242 U | * | 12/2013 | |
| CN | 105746220 A | * | 7/2016 | A01G 9/021 |

(Continued)

*Primary Examiner* — Magdalena Topolski

(74) *Attorney, Agent, or Firm* — Gearhart Law, LLC

(57) ABSTRACT

The vertical hydroponic plant systems and methods may include vertically mounted wall systems that provide ease of access while providing a pleasing overall aesthetic and reducing the overall footprint on the environment in which it is located. Various methodologies, such as integrated and removable components, may be employed to provide optimal lighting and nutrients for plant growth by vertical hydroponic plant systems.

20 Claims, 7 Drawing Sheets

(56)             References Cited

U.S. PATENT DOCUMENTS

| | | | |
|---|---|---|---|
| 2016/0066525 A1 | 3/2016 | Duquesnay et al. | |
| 2017/0142912 A1 | 5/2017 | Gasmer et al. | |
| 2018/0199526 A1 | 7/2018 | Guo et al. | |
| 2020/0128761 A1 | 4/2020 | Kincaid et al. | |
| 2022/0369566 A1* | 11/2022 | Venkata | A01G 9/16 |
| 2023/0000025 A1* | 1/2023 | Smith | A01G 31/02 |
| 2025/0000040 A1 | 1/2025 | Redington et al. | |
| 2025/0000041 A1 | 1/2025 | Redington et al. | |

FOREIGN PATENT DOCUMENTS

| | | | | |
|---|---|---|---|---|
| CN | 106193966 A | * | 12/2016 | E06B 7/28 |
| CN | 107047115 A | * | 8/2017 | E04B 2/00 |
| CN | 112273217 A | * | 1/2021 | A01G 7/045 |
| CN | 113179933 A | * | 7/2021 | A01G 31/00 |
| CN | 114885701 A | * | 8/2022 | A01G 9/023 |
| CN | 115176620 A | * | 10/2022 | E04H 1/1205 |
| CN | 117981608 A | * | 5/2024 | A01G 9/247 |
| CN | 118140736 A | * | 6/2024 | A01C 23/047 |
| ES | 1069610 U | * | 4/2009 | A01G 9/025 |
| FR | 3082700 A1 | * | 12/2019 | A01G 9/02 |
| GB | 2532467 A | | 5/2016 | |
| KR | 20140096769 A | * | 8/2014 | E04F 13/0871 |
| KR | 20160002513 U | * | 7/2016 | A01G 9/025 |
| KR | 20160095863 A | * | 8/2016 | A01G 9/024 |
| KR | 101878092 B1 | * | 7/2018 | F25D 23/04 |
| KR | 102537574 B1 | * | 6/2023 | A01C 23/042 |
| WO | 2022231517 A1 | | 11/2022 | |

* cited by examiner

METHODS AND SYSTEMS FOR VERTICAL HYDROPONIC PLANT CULTIVATION

CROSS-REFERENCE TO RELATED APPLICATIONS

This application claims priority to U.S. Application Ser. No. 63/523,369 filed on Jun. 27, 2023, the contents of which are herein fully incorporated by reference in its entirety.

BACKGROUND OF THE EMBODIMENTS

Plants require certain nutrients in order to grow and be healthy. Plant nutrients are typically divided into macronutrients and micronutrients. The macronutrients are sometimes divided into primary macronutrients and secondary macronutrients. Examples of primary macronutrients include nitrogen, phosphorus, and potassium. Examples of secondary macronutrients include sulfur, calcium, and magnesium. Examples of micronutrients include iron, molybdenum, boron, copper, sodium, zinc, nickel, aluminum, and silicon. When plants are grown in soil, the soil provides many, if not all, of these vital nutrients. In some cases, fertilizer may be added to the soil to provide nutrients.

Hydroponics is a method of growing plants without the use of soil. A hydroponic system and/or method may use water containing plant nutrients to facilitate plant growth. The field of the embodiments of the present invention relates generally to vertical hydroponic plant production systems and methods employing those systems. In particular, the present invention and its embodiments relate to a vertical hydroponic plant production system that allows for vertical hydroponic plant production in a fraction of the space necessary for traditional plant production techniques.

Traditional hydroponic systems and methods often direct their focus on horizontal production techniques which, in turn, are subject to space constraints. Prior vertical hydroponic systems and methods have either been impractical, expensive to operate, or inefficient. Often these systems utilize a growth medium that becomes heavy when saturated, is clogged by roots, and/or requires a prohibitive amount of maintenance. In addition, conventional technology makes it difficult to allow for the in-store display of live, growing vegetables and is not conducive to vegetable and herb sales to customers where customers can pick their own produce. Little technology exists that allows vertical plant systems that are conveniently wall mounted and provide ease of access to the operative portions of the system.

For example, U.K. Patent Application 2532467 pertains to a vertical hydroponic growing system that comprises an elongated housing having a tubular outer wall with a longitudinally extending slot leading to an interior of the housing for holding hydroponic growing medium material. A plant held by the growing medium material grows out through the slot. The housing has an upper fluid inlet for supplying a nutrient solution to the growing medium and a lower fluid outlet for recovering unused nutrient solution. Within said housing interior is at least one transversely facing abutment which sub-divides said interior volume into at least two longitudinally extending contiguous portions, including a first hydroponic growing portion and an aeroponic growing portion, the hydroponic growing portion being between the slot and the aeroponic growing portion. The housing has at least one removable panel for providing access to the interior volume of the housing for the loading of the hydroponic growing medium.

U.S. Pat. No. 10,856,480 pertains to a system and method for cultivating plants. The system may include a tower structure having a vertical series of vessels for holding a netted pot or other containers. The system may have a pressurized irrigation system that is in fluid communication with each vessel. The system may further include lamps to provide an adequate light source. The system may also include sensors, monitors, and controls to establish and maintain environmental conditions suitable for proper plant growth. The system may further be implemented as a scalable system in which multiple tower structures may be installed into a scaffold system. Sets of towers may be slidably affixed to a scaffold such that the towers may be slid along a track thereby creating easy access to the plants, vessels, lights, and the irrigation system. The system may be expanded to include multiple scaffolds affixed to a skeletal frame or compartment interior.

Further, U.S. Pat. No. 9,591,814 pertains to a lightweight, modular, adjustable vertical hydroponic growing system and method of Native American design for cultivation plants and beneficial soil organisms (BSO's) in symbiotic combination. Forest-like arrays of fully rotatable and demountable grow tubes are suspended within climate moderating greenhouses, optionally from conveyor tracks. The tubes are filled with light-weight, porous 100% inorganic grow media predominately comprised of expanded volcanic or recycled glass granules. The grow tube arrays are provided with an insulated, overhead-mounted fertigation distribution system delivering metered intermittent flows from insulated mixing and holding tanks. The flows are recycled via an insulated return piping system to maintain cool fertigation temperatures near those of natural groundwater. Fertigation supply mains provided with vortex flow induction devices impart rotational momentum to flows for delivery of uniform aerated fertigation to plants and BSO's via a combination of open-tube emitters and gravity flows within grow tubes.

However, known hydroponic and/or aeroponic systems and methods fail to account for the structures and methods described in the present application.

SUMMARY OF THE EMBODIMENTS

In general, the present invention and its embodiments provide for hydroponic plant cultivation systems and methods. As is described herein, it is generally known to utilize both vertical and horizontal growing methods in hydroponic systems. However, the present invention and its embodiments utilize various components that can, in some embodiments, be readily removed or interchanged primarily for purposes of harvesting and cleaning. The wall-mounted units described herein provide a pleasing aesthetic to a home, office, restaurant, and the like without taking up valuable real estate on the ground. In at least one embodiment, the wall-mounted units have framing elements with designs, textures, etc. that can be custom made or selected from set designs to match a particular look, feel, etc. of the environment in which the wall-mounted unit is to be placed.

Any floor-mounted units described herein are designed to be integrated to have a minimal footprint and resemble bookshelves or shelving such that it resembles furniture with an integrated plant growing system. The floor-mounted units may have storage spaces (additional equipment, water/nutrient storage, etc.) integrated therein and such spaces can be configured to be above or below the growing space(s) of the floor-mounted unit.

Most all components of the embodiments of the present invention are desired to be completely "plug-and-play" such that between harvests all components can be easily cleaned or replaced.

In one embodiment of the present invention, there is a hydroponic plant cultivation apparatus having a housing; a housing cover hingeably coupled to the housing; a lighting mechanism coupled to the housing cover; a trough configured to reside in the housing; a panel configured to engage an opening in the trough, wherein the panel has a plurality of elbows coupled to the panel; and a dispersion system configured to pump and disperse water and/or nutrients.

In another embodiment of the present invention, there is a wall-mounted hydroponic plant cultivation apparatus having a housing having a top, a bottom, a first side, and a second side; a housing cover hingeably coupled to the housing, wherein the housing cover comprises an inner frame and an outer frame, and wherein the inner frame and the outer frame are separated by a distance; a lighting mechanism coupled to a rear surface of the outer frame; a removable trough having an opening and configured to be positioned upon an upper surface of the bottom of the housing; a panel configured to engage the opening in the trough, wherein the panel has a plurality of apertures; a plurality of elbows coupled to the panel, wherein one of each of the plurality of elbows is configured to engage one of the plurality of apertures in the panel; and a dispersion system configured to pump and disperse water and/or nutrients onto a rear surface of the panel.

In yet another embodiment of the present invention there is a wall-mounted hydroponic plant cultivation apparatus having a housing having a top, a bottom, a first side, and a second side; a housing cover hingeably coupled to the housing, wherein the housing cover comprises an inner frame and an outer frame, and wherein the inner frame and the outer frame are separated by a distance; at least one lighting mechanism coupled to a rear surface of the outer frame; a removable trough having an opening and configured to be positioned upon an upper surface of the bottom of the housing; a panel having a securement mechanism on a rear surface of the panel, wherein the securement mechanism configured to a complimentary securement mechanism of the housing or trough, and wherein the panel has a plurality of apertures; a plurality of elbows coupled to the panel, wherein one of each of the plurality of elbows is configured to engage one of the plurality of apertures in the panel; and a dispersion system having a pump and piping configured to pump and disperse water and/or nutrients onto a rear surface of the panel, wherein the pump resides in the trough.

In yet another embodiment of the present invention, there is a floor-mounted hydroponic plant cultivation apparatus having a housing; a housing cover hingeably coupled to the housing; a lighting mechanism coupled to the housing cover; a trough configured to engage the housing; a panel configured to engage an opening in the trough, wherein the panel has a plurality of elbows coupled to the panel; and a dispersion system configured to pump and disperse water and/or nutrients. The floor-mounted hydroponic plant cultivation apparatus in some embodiments has the same form factor as the wall-mounted hydroponic plant cultivation apparatus, whereas in others it takes a shelving or book-shelf type form factor.

In general, the present invention succeeds in conferring the following benefits and objectives.

It is an object of the present invention to provide a vertical hydroponic plant system that is modular.

It is an object of the present invention to provide a vertical hydroponic plant system that can host many different cultivars.

It is an object of the present invention to provide a vertical hydroponic plant system that can be disassembled, cleaned, reassembled, and the like by hand.

It is an object of the present invention to provide a vertical hydroponic plant system that is hung from support structures above ground level.

It is an object of the present invention to provide a vertical hydroponic plant system that is wall mounted or floor mounted.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF THE EMBODIMENTS

Figure 1:
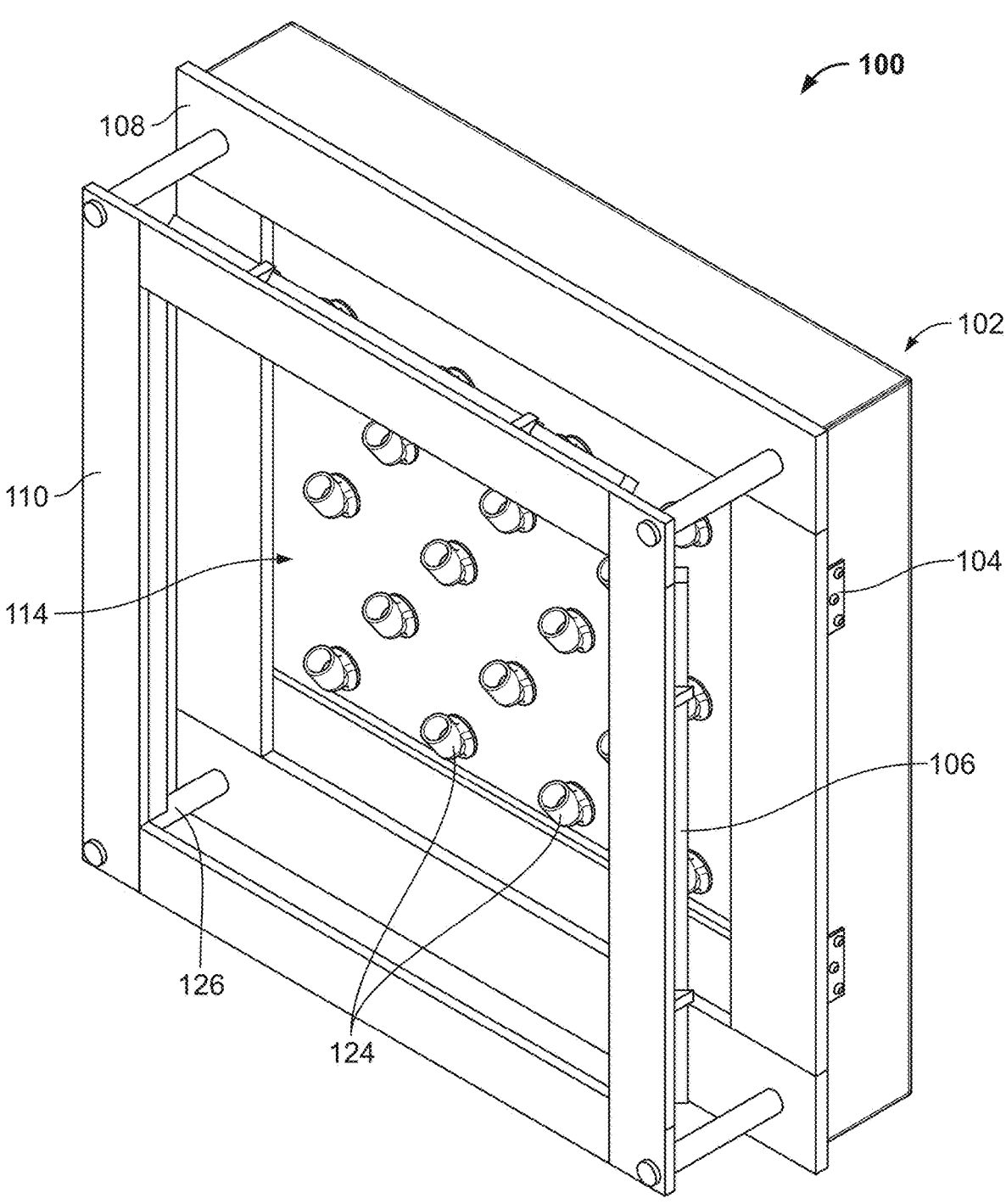
FIG. 1 is a perspective view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

As used herein, the term "panel" means a single sheet of flat rigid smooth composite substrate having holes or apertures therethrough in which the plants grow. The hole sizes, spacing, and pattern could vary with the cultivar the panels are designed for.

As used herein, the term "elbows" means molded tubular plastic pieces which engage with the holes or apertures in the panels. The elbows are open tubes with a built-in angle and a flange at the panel end. The length, diameter, and angle of the elbows can vary with the cultivar the elbows are intended to secure to the panel.

Referring now to FIGS. 1-7, shown is a wall mounted hydroponic plant growing system 100 configured to be utilized as a stand-alone hydroponic growing system. Such wall mounted hydroponic plant growing system 100 may be best suited for residential and retail customers who will mount the system on the walls of their homes, restaurants, bars, or businesses to provide fresh produce within a beautiful piece of wall mounted art. In other embodiments, the wall mounted hydroponic plant growing system 100 may embody a taller unit that would sit on the floor and rest against the wall like a bookcase. In said embodiments, the panel and elbow component may be the same or similar to the previous embodiments described herein.

In at least one embodiment, the wall mounted hydroponic plant growing system 100 would be delivered to the end user assembled and would only need to be hung on or affixed to the wall and plugged into an appropriate power source. Plant seedlings could be grown from seed on-site or be purchased and delivered pre-grown to be installed directly into the elbows 124. In at least one embodiment, there will be a subscription service for plants and maintenance so after all the produce has been consumed, a professional technician can arrive to remove the used panel 114 from the wall mounted hydroponic plant growing system 100, and replace it with a new panel 114 that has been pre-planted with the plants of the user's choice. These visits can be scheduled as needed (e.g., every 1-3 weeks), and the technician can adjust any water or nutrient levels at the time. However, in some embodiments, the end user may receive pre-packaged nutrients to facilitate plant growth. These pre-packaged nutrients may be containers or pods that contain a predetermined amount of nutrients, in either solid or liquid form, which would require an end user to add and mix water in specific quantities (e.g., one liter, one gallon, etc.) based on the amount of water being used in the trough.

Referring now to FIG. 1, there is a perspective view of a wall mounted hydroponic plant growing system 100. The wall mounted hydroponic plant growing system 100 generally has a housing 102, hinges 104, lighting 106, an inner frame 108, an outer frame 112, trough 112, panel 114, elbows 124, and supports 126.

The housing 102 provides the mechanism of securement of the wall mounted hydroponic plant growing system 100 to the wall of a structure such as a house, restaurant, etc. The housing 102 may be coupled to the wall of a structure via conventional means that will support the weight of the wall mounted hydroponic plant growing system 100. Preferably, the housing 102 has a top, a bottom, a first side, and a second side. In some embodiments, the housing 102 may have a rear surface as well. The housing 102 can take virtually any shape or size that is desired by the end user. The top, bottom, first side, second side, and optional rear form a recess in the housing by which some of the components of the wall mounted hydroponic plant growing system 100 may reside.

Figure 2:
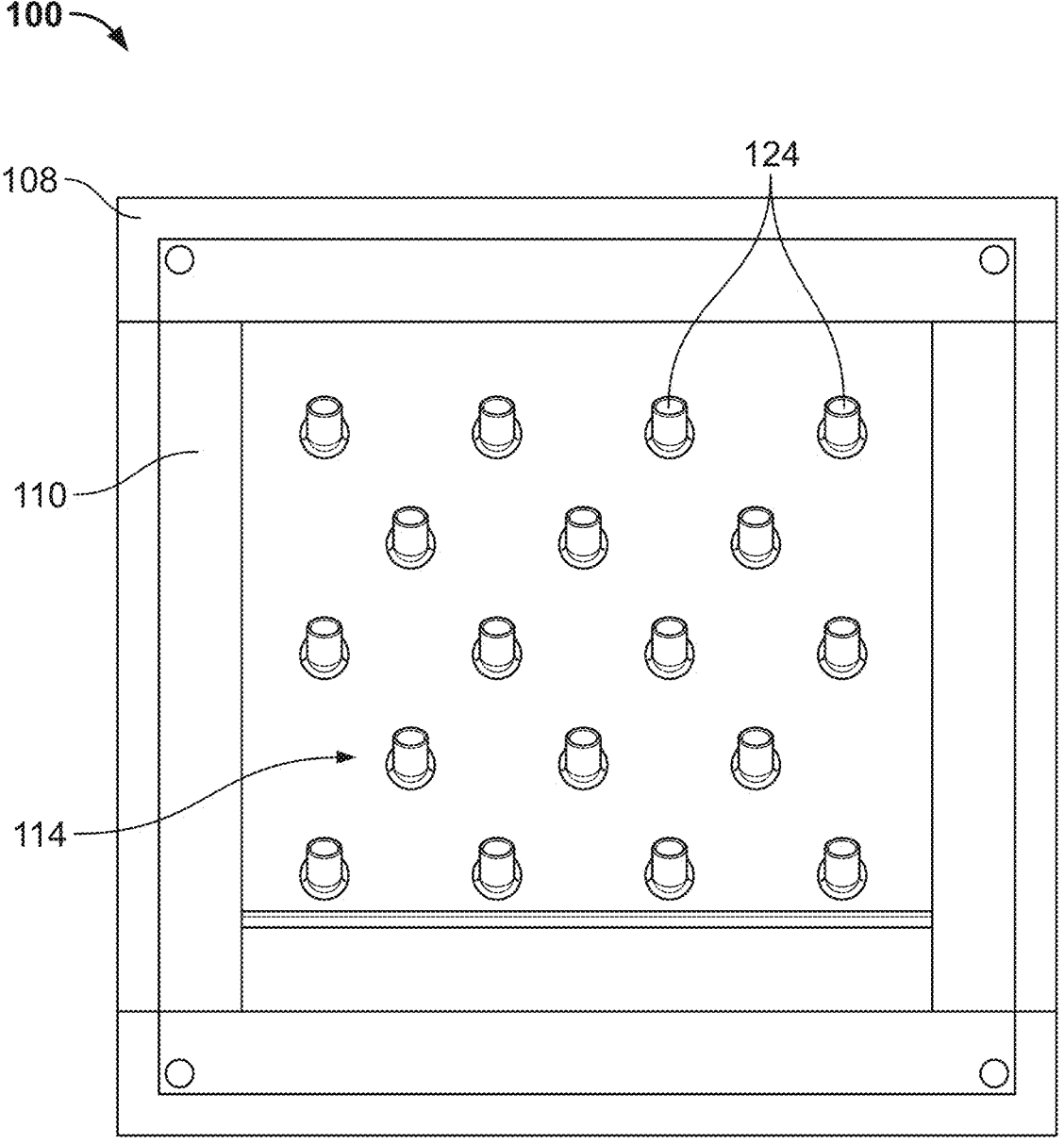
FIG. 2 is a front view of an embodiment of the present invention.
Figure 3:
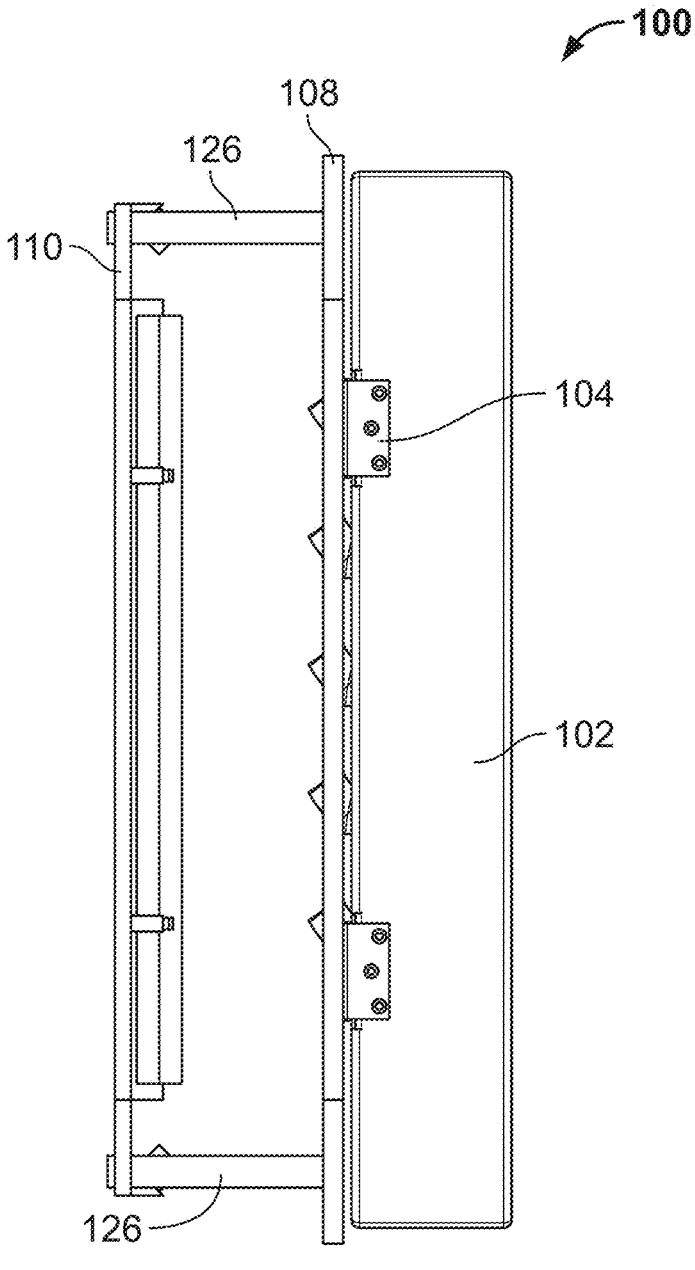
FIG. 3 is a side view of an embodiment of the present invention.
Figure 4:
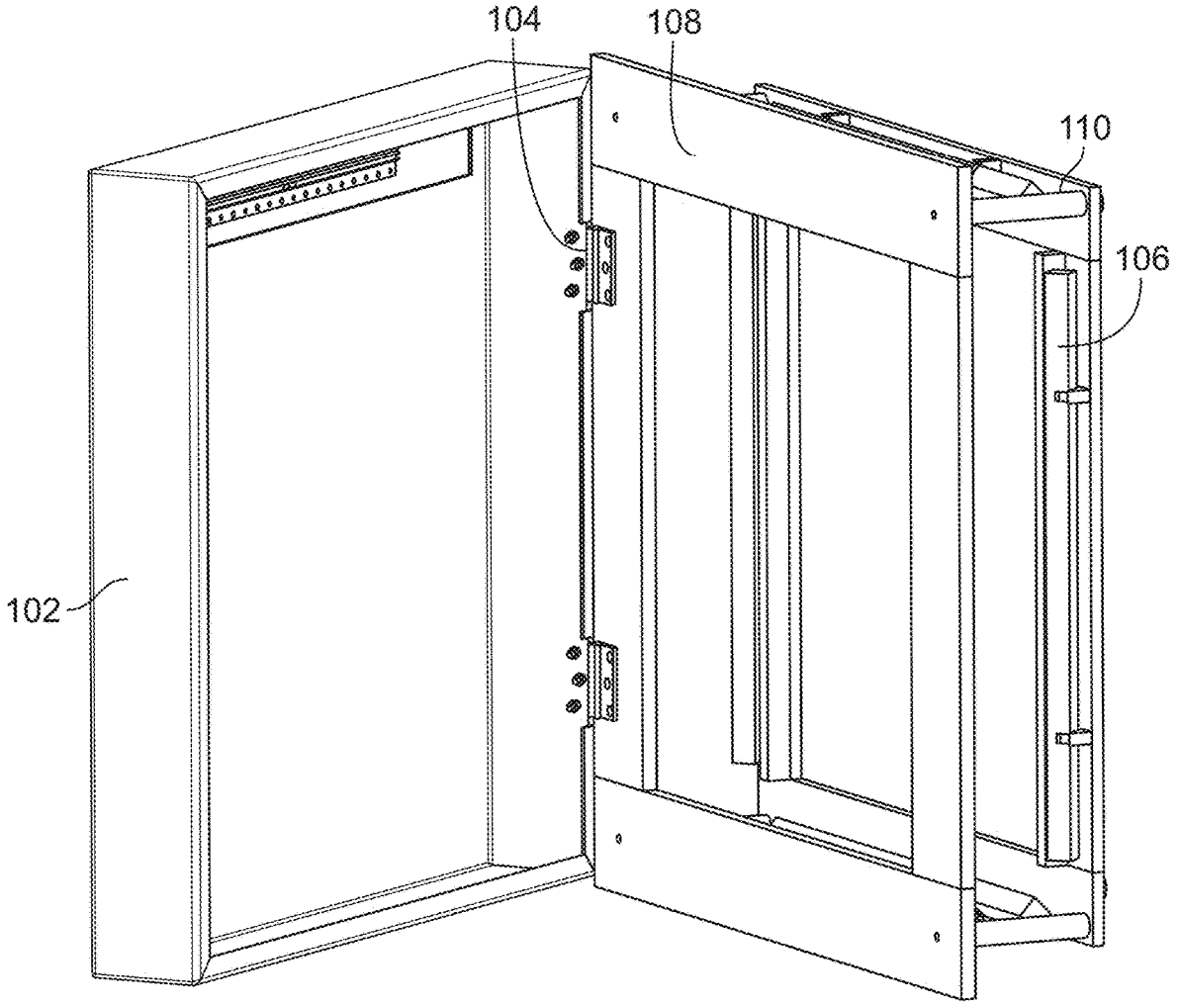
FIG. 4 is a second perspective view of an embodiment of the present invention showing the frame in an open position.

As shown in FIGS. 2 and 3, at least one and preferably at least two hinges 104 are used to couple the inner frame 108 to the housing 102. It is preferred that the hinges 104 are located on either of the first side or the second side of the housing 102 but other arrangements of hinges 104 or comparable securing mechanisms may be employed. Ideally, the hinges allow the inner frame 108 to rotate at least 90° from a closed position to an open position. In one embodiment, there are hinges along one side that allow the inner frame 108, outer frame 110, and lighting mechanisms 106 to swing open like the door of a cabinet. In some embodiments, an optional locking mechanism may be employed to prevent the inner frame 108 from inadvertently being opened.

The inner frame 108, in addition to providing a point of attachment to the housing 102 further provides a support for the outer frame 110. The outer frame 110 is coupled to the inner frame 108 via one or more supports 126. The supports 126 are configured to secure the outer frame 110 to the inner frame 108 as well as provide a distance between the inner frame 108 and the outer frame 110. The importance of the distance between the two frames stems from the distance required for the lighting mechanism 106 to be from the panel 114 and subsequently the plants being grown and is best visualized in FIG. 3.

In some embodiments, the supports 126 may be interchanged thereby changing a distance between the inner frame 108 and the outer frame 110. In other embodiments, the supports 126 are telescoping thereby allowing one to manipulate the outer frame 110 respective to the inner frame 108 thereby changing the distance between the two frames. In at least one embodiment, an outer surface of the outer frame 110 is adorned with one or more embellishments, textures, designs, images, colors, and the like or some combination thereof.

On a rear surface of the outer frame 110 are the lighting mechanisms 106. The lighting mechanism 106 may be light emitting diode (LED) strip lights along some portion of the inner surface of the outer frame 110. In some embodiments, the lighting mechanisms 106 comprise only one LED strip, whereas in others there are more than one and even twenty or more total LED strips. These lighting mechanisms 106 are configured to project light back to the panel 114 to facilitate plant growth. The lighting mechanisms 106 may be adhesively coupled to the rear surface of the outer frame 110 as well as coupled by other means including conventional securement means known in the art. The lighting mechanisms 106 may be configured to emit about 400 nm to about 800 nm wavelength light. Most preferably, the light emitted from the lighting mechanisms is about 400 nm to about 700 nm. In some embodiments combinations different wavelength light are used and some LED strips can emit both wavelengths, whereas others may be configured to emit only a particular wavelength.

There are, in some embodiments, side trim pieces arranged on an outer side surface of the outer frame 110 to reduce glare back from the lighting mechanisms 106 into the room and/or surrounding environment. In yet further embodiments, there are embodiments which have no lighting mechanisms. This allows the wall mounted hydroponic plant growing system 100 to be positioned indoors and/or outdoors and rely on natural light (e.g., sunlight) as opposed to a man-made light source. In such an embodiment, the operation of the wall mounted hydroponic plant growing system 100 otherwise remains the same as described herein.

Further, the angles and/or intensities of the lighting mechanisms 106 may be able to be changed as desired. The lighting mechanisms 106 and the pump 120 (see FIGS. 6-7) of the wall mounted hydroponic plant growing system 100 are preferably controlled by individual timers recessed into an electrical box within the housing 102. In a preferred embodiment, there is an integrated control panel with a single wall plug whereas in some other embodiments, the wall mounted hydroponic plant growing system 100 is controlled through a web or mobile application, and even further a control panel either inside the housing (accessible with the door open) or available through the sidewall of the housing.

Figure 5:
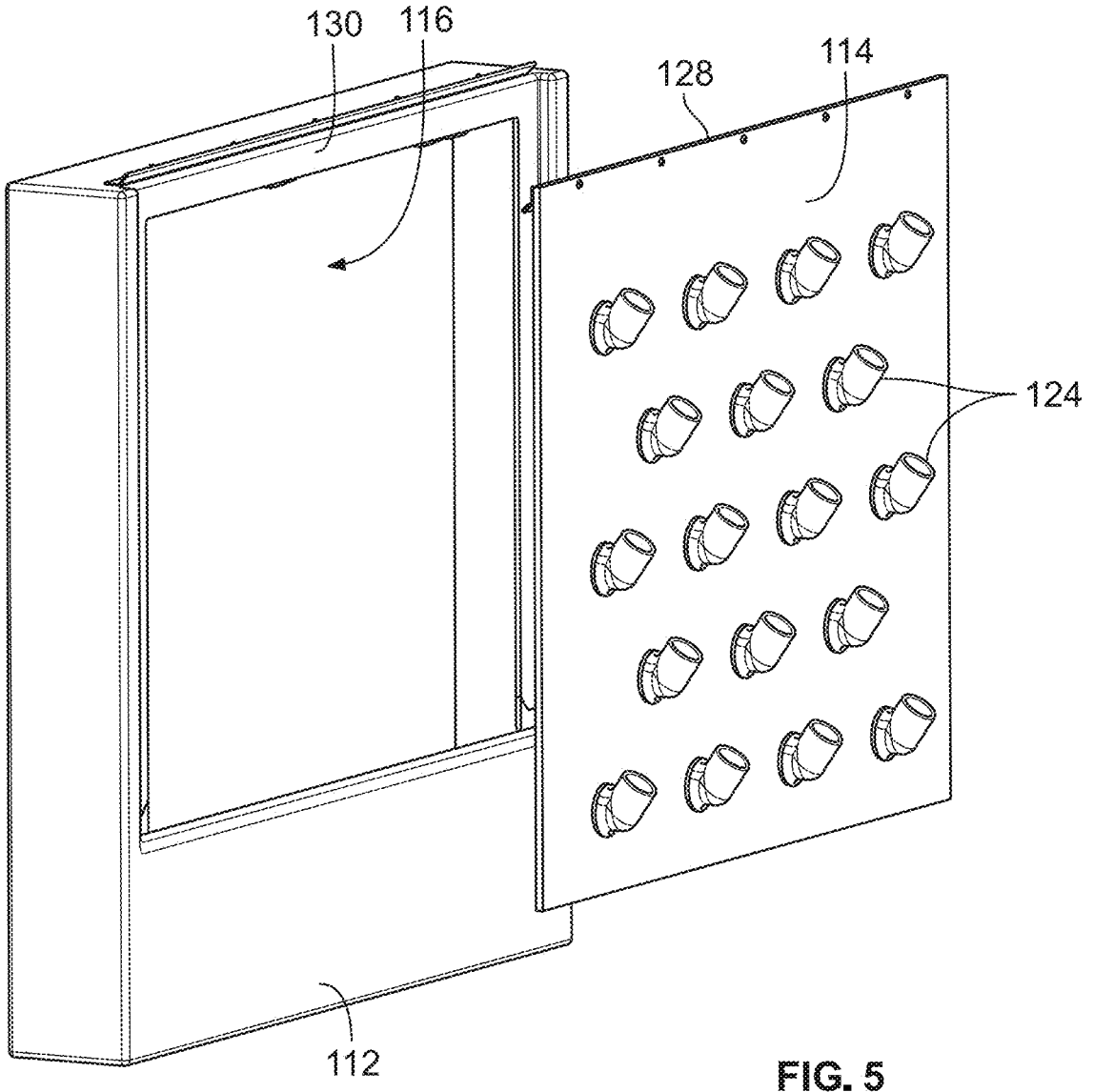
FIG. 5 illustrates the trough and panel removed from the frame and housing.

As shown in FIGS. 2 and 5, the panel 114 of the wall mounted hydroponic plant growing system 100 is configured to receive a plurality of elbows 124. The panel 114 may be formed from a singular piece of substrate and comprise a number of apertures. Each aperture is appropriately sized and shaped to receive one elbow 124. Each elbow 124, is configured to provide at least one plant a location to grow. In general, the elbows 124 are molded tubular plastic pieces that engage with the holes or apertures in the panel 114. The elbows 124 are generally open tubes with a built-in angle and a flange configured to abut an outer surface of the panel 114. The flange prevents the elbow from being pushed through a thickness of the panel 114 and into the interior of the wall mounted hydroponic plant growing system 100. The length, diameter, and angle of the elbows 124 can vary with the cultivar the elbows 124 are intended to secure to the panel 114.

Figure 6:
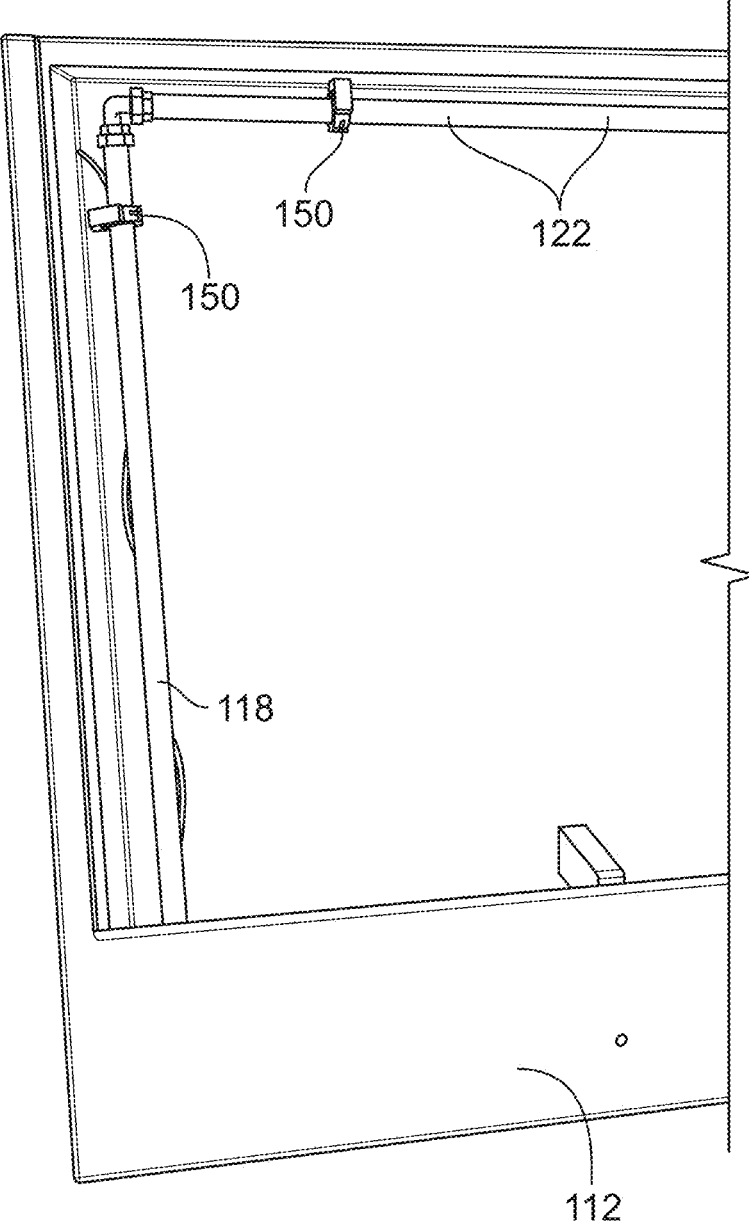
FIG. 6 is a close-up view of the trough and dispersion system.
Figure 7:
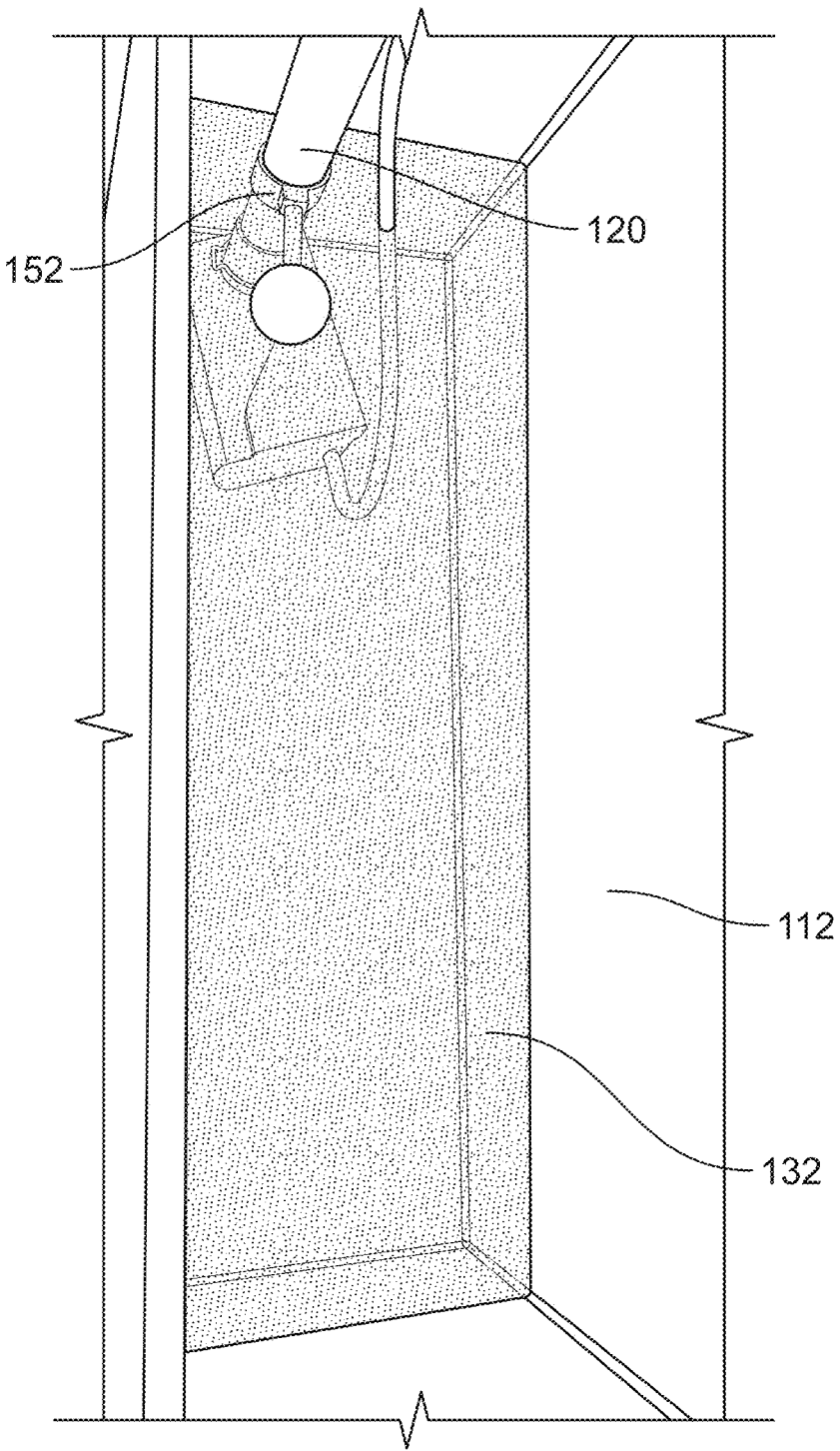
FIG. 7 is a top-down view of the trough showing a pump and piping of the dispersion system.

As shown in FIG. 5 both the trough 112 and the panel 114 are removable from one another and the housing 102. The trough 112 is generally a self-contained structure that comprises a bottom reservoir, a first side, a second side, and a top. The bottom reservoir, first side, second side, and top define an opening or aperture in the trough structure that enables the trough 112 to receive the panel 114. In the trough 112, as further described in relation to FIGS. 6-7, is a pump 120 and piping 118 that allows for the dispersion of water and/or nutrients onto the roots of the plants growing in the elbows 124. The piping 118 is preferably fixed via one or more clamps 150 to the trough 112.

The panel 114 preferably has a French cleat or other securement mechanism on a rear side of the panel 114 that allows it to be secured to a complimentary structure located on either of the housing 102 or the trough 112. Preferably, in order to remove the panel 114 from the trough 112 one simply lifts up on the panel 114. This allows for ease of removal when needed for planting, harvesting, cleaning, and the like. The trough 112 is preferably removable for at least the same reasons.

As shown in FIG. 2, the elbows 124 are present in an alternating staggered configuration. However, other configurations and numbers of elbows 124 can be varied as desired by the end user or as dictated by the type of cultivar being grown at a given time. In some embodiments, elbows 124 can be removed and plugs can be inserted into the unused aperture in the panel 114.

Referring now to FIGS. 6 and 7, there is a view of the removable trough 112 and the dispersion system including a pump 120 and piping 118. The trough comprises, in part, a water storage reservoir at a bottom of the trough 112 and holds approximately two to three gallons of water for plant irrigation. In other embodiments, the shape and size of the trough 112 may allow for more or less water to be retained therein. However, in some embodiments, the trough 112 is integrated with the housing 102 such that the trough 112 is not removable from the housing 102.

In a preferred embodiment, the pump 120, as shown in FIG. 7, activates on a timer switch and injects water 132 (and any nutrients in the water) upwards through the piping 118 to additional piping 118 which runs across the top, horizontal boundary of the housing 102. At least one segment of the piping 118, preferably that which runs across the top, horizontal bounding of the housing 102, has distribution holes or apertures 122 positioned just above the apertures of the panel 114, thereby allowing for falling water 132 to collide with plant roots and provide water uptake. The falling water 132 is then directed back into the trough 112 and the pump 120 via an angled interior bottom of the trough 112 to be further used the next time the pump 120 runs a cycle.

The level of water 132 within the trough 112 and system as a whole is preferably monitored by a float 152. The float 152 may be clamped or otherwise secured to the pump 120 and/or piping 118 as needed. The float 152 may send a message or alert if the water level within the trough 112 drops below a certain predetermined amount. The water level required in the trough 112 to generate an alert to a user may be configurable either manually or via a mobile/web application. In other embodiments, other mechanisms of monitoring a water level of the system, such as clear tubes which provide a visual indication of the current water level, may be employed.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A hydroponic plant cultivation apparatus comprising:
   a housing;
   a housing cover hingably coupled to the housing;
     wherein the housing cover comprises an inner frame and an outer frame, and
     wherein the inner frame and the outer frame are separated by a distance;
   a lighting mechanism coupled to the outer frame of the housing cover;
   a trough having an opening and configured to be positioned upon a bottom surface of the housing;
   a panel configured to engage an opening in the trough, wherein the panel has a plurality of elbows coupled to the panel; and
   a dispersion system configured to pump and disperse water and/or nutrients.

2. The apparatus of claim 1 further comprising one or more supports configured to separate the lighting mechanism from the panel by a distance.

3. The apparatus of claim 1 further comprising a plurality of apertures in the panel.

4. The apparatus of claim 3 wherein one of each of the plurality of elbows engages one of the plurality of apertures in the panel.

5. The apparatus of claim 1 further comprising a securement mechanism on a rear surface of the panel.

6. The apparatus of claim 5 wherein the securement mechanism is configured to engage a complimentary securement mechanism of the trough.

7. The apparatus of claim 1 wherein an angle of the lighting mechanism is capable of being modified.

8. The apparatus of claim 1 wherein the apparatus is wall-mounted.

9. A wall-mounted hydroponic plant cultivation apparatus comprising:
   a housing having a top, a bottom, a first side, and a second side;
   a housing cover hingably coupled to the housing,
     wherein the housing cover comprises an inner frame and an outer frame, and
     wherein the inner frame and the outer frame are separated by a distance;
   a lighting mechanism coupled to a rear surface of the outer frame;

a removable trough having an opening and configured to be positioned upon an upper surface of the bottom of the housing;

a panel configured to engage the opening in the trough, wherein the panel has a plurality of apertures;

a plurality of elbows coupled to the panel,
    wherein one of each of the plurality of elbows is configured to engage one of the plurality of apertures in the panel;

a dispersion system configured to pump and disperse water and/or nutrients onto a rear surface of the panel; and a control system.

10. The wall-mounted hydroponic plant cultivation apparatus of claim 9 wherein the housing cover is hingably coupled to the first side of the housing.

11. The wall-mounted hydroponic plant cultivation apparatus of claim 9 further comprising a plurality of supports configured to support the outer frame.

12. The wall-mounted hydroponic plant cultivation apparatus of claim 9 further comprising a pump.

13. The wall-mounted hydroponic plant cultivation apparatus of claim 12 wherein the pump resides in the trough.

14. The wall-mounted hydroponic plant cultivation apparatus of claim 12 further comprising one or more lengths of piping coupled to the pump.

15. The wall-mounted hydroponic plant cultivation apparatus of claim 14 wherein at least one of the one or more lengths of piping has one or more apertures.

16. A wall-mounted hydroponic plant cultivation apparatus comprising:

a housing having a top, a bottom, a first side, a second side, and a back;

a housing cover hingably coupled to the housing,
    wherein the housing cover comprises an inner frame and an outer frame, and wherein the inner frame and the outer frame are separated by a distance;

at least one lighting mechanism coupled to a rear surface of the outer frame;

a removable trough having an opening and configured to be positioned upon an upper surface of the bottom of the housing;

a panel having a securement mechanism on a rear surface of the panel,
    wherein the securement mechanism configured to a complimentary securement mechanism of the housing or the trough, and
    wherein the panel has a plurality of apertures;

a plurality of elbows coupled to the panel,
    wherein one of each of the plurality of elbows is configured to engage one of the plurality of apertures in the panel; and a dispersion system having a pump and piping configured to pump and disperse water and/or nutrients onto a rear surface of the panel,
    wherein the pump resides in the trough.

17. The wall-mounted hydroponic plant cultivation apparatus of claim 16 wherein the piping comprises a first pipe and a second pipe.

18. The wall-mounted hydroponic plant cultivation apparatus of claim 17 wherein the first pipe is oriented vertically and the second pipe is coupled to the first pipe and oriented horizontally.

19. The wall-mounted hydroponic plant cultivation apparatus of claim 16 wherein the plurality of elbows are removable.

20. The wall-mounted hydroponic plant cultivation apparatus of claim 18 wherein the second pipe has a plurality of apertures configured to disperse water and/or nutrients along a rear surface of the panel.

* * * * *